US009135237B2

(12) United States Patent
Deshmukh et al.

(10) Patent No.: US 9,135,237 B2
(45) Date of Patent: Sep. 15, 2015

(54) SYSTEM AND A METHOD FOR GENERATING SEMANTICALLY SIMILAR SENTENCES FOR BUILDING A ROBUST SLM

(75) Inventors: Om D. Deshmukh, New Delhi (IN);
Sachindra Joshi, New Delhi (IN);
Shajith I. Mohamed, Karnataka (IN);
Ashish Verma, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 807 days.

(21) Appl. No.: 13/181,923

(22) Filed: Jul. 13, 2011

(65) Prior Publication Data

US 2013/0018649 A1  Jan. 17, 2013

(51) Int. Cl.
*G06F 17/27* (2006.01)
*G10L 15/26* (2006.01)
*G06F 17/28* (2006.01)

(52) U.S. Cl.
CPC .......... *G06F 17/274* (2013.01); *G06F 17/2795* (2015.01); *G06F 17/2881* (2013.01); *G10L 15/26* (2013.01)

(58) Field of Classification Search
CPC ................ G06F 17/27; G06F 17/2785; G06F 17/30684; G10L 15/18
USPC ............................ 704/1, 9, 10, 251, 257, 275
See application file for complete search history.

(56) References Cited

U.S. PATENT DOCUMENTS

| | | | | |
|---|---|---|---|---|
| 5,809,462 A * | 9/1998 | Nussbaum | | 704/232 |
| 5,845,306 A * | 12/1998 | Schabes et al. | | 715/209 |
| 7,610,382 B1 * | 10/2009 | Siegel | | 709/226 |
| 8,626,510 B2 * | 1/2014 | Mizutani | | 704/260 |
| 2001/0014852 A1 * | 8/2001 | Tsourikov et al. | | 704/9 |
| 2003/0055623 A1 * | 3/2003 | Epstein et al. | | 704/1 |
| 2005/0125215 A1 * | 6/2005 | Wu et al. | | 704/1 |
| 2006/0247914 A1 * | 11/2006 | Brener et al. | | 704/1 |
| 2007/0233458 A1 * | 10/2007 | Sakao et al. | | 704/9 |
| 2008/0071533 A1 * | 3/2008 | Cave et al. | | 704/235 |
| 2008/0120093 A1 * | 5/2008 | Izumida et al. | | 704/10 |
| 2008/0275694 A1 * | 11/2008 | Varone | | 704/9 |
| 2008/0300881 A1 * | 12/2008 | Kashima et al. | | 704/257 |
| 2008/0312906 A1 * | 12/2008 | Balchandran et al. | | 704/9 |
| 2010/0049517 A1 * | 2/2010 | Huang et al. | | 704/251 |
| 2010/0063799 A1 * | 3/2010 | Jamieson | | 704/9 |
| 2010/0145680 A1 * | 6/2010 | Yun et al. | | 704/10 |
| 2010/0250254 A1 * | 9/2010 | Mizutani | | 704/260 |
| 2010/0286979 A1 * | 11/2010 | Zangvil et al. | | 704/9 |
| 2011/0184720 A1 * | 7/2011 | Zangvil | | 704/2 |
| 2011/0288852 A1 * | 11/2011 | Dymetman et al. | | 704/4 |
| 2011/0301941 A1 * | 12/2011 | De Vocht | | 704/9 |
| 2012/0330647 A1 * | 12/2012 | Burges et al. | | 704/9 |

OTHER PUBLICATIONS

Pang et al., Syntax-based Alignment of Multiple Translations: Extracting Paraphrases and Generating New Sentences, 2003, ACM, Proceeding NAACL '03 vol. 1, pp. 102-109.*

* cited by examiner

*Primary Examiner* — Lamont Spooner
(74) *Attorney, Agent, or Firm* — Banner & Witcoff, Ltd.

(57) ABSTRACT

A system and method are described for generating semantically similar sentences for a statistical language model. A semantic class generator determines for each word in an input utterance a set of corresponding semantically similar words. A sentence generator computes a set of candidate sentences each containing at most one member from each set of semantically similar words. A sentence verifier grammatically tests each candidate sentence to determine a set of grammatically correct sentences semantically similar to the input utterance. Also note that the generated semantically similar sentences are not restricted to be selected from an existing sentence database.

10 Claims, 3 Drawing Sheets

SYSTEM AND A METHOD FOR GENERATING SEMANTICALLY SIMILAR SENTENCES FOR BUILDING A ROBUST SLM

TECHNICAL FIELD

The invention generally relates to computer systems for natural language processing such as for automatic speech recognition (ASR), and more specifically to statistical language models used in such systems.

BACKGROUND ART

One specific example of a natural language processing application is an automatic speech recognition (ASR) system that tries to determine a representative meaning (e.g., text) corresponding to input speech. Typically, the input speech is processed into a sequence of digital frames. Each frame can be thought of as a multi-dimensional vector that represents various characteristics of the speech signal present during a short time window of the speech. In a continuous speech recognition system, variable numbers of frames are organized as "utterances" representing a period of speech followed by a pause which in real life loosely corresponds to a spoken sentence or phrase.

The ASR system compares the input utterances to find statistical acoustic models that best match the vector sequence characteristics and determines corresponding representative text associated with the acoustic models. When framing the problem in a statistical context, it is often discussed in terms of the well-known Bayes formula. That is, if given some input observations A, the probability that some string of words W were spoken is represented as P(W|A), where the ASR system attempts to determine the most likely word string:

$$\hat{W} = \arg\max_{W} P(W \mid A)$$

Given a system of statistical acoustic models, this formula can be re-expressed as:

$$\hat{W} = \arg\max_{W} P(W) P(A \mid W)$$

where P(A|W) corresponds to the acoustic models and P(W) represents the value of a statistical language model reflecting the probability of given word in the recognition vocabulary occurring.

Modern acoustic models typically use probabilistic state sequence models such as hidden Markov models (HMMs) that model speech sounds (usually phonemes) using mixtures of probability distribution functions, typically Gaussians. Phoneme models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

SUMMARY

Embodiments of the present invention are directed to a system and method for generating semantically similar sentences for a statistical language model. A semantic class generator determines for each word in an input utterance a set of corresponding semantically similar words. A sentence generator computes a set of candidate sentences each containing at most one member from each set of semantically similar words. A sentence verifier grammatically tests each candidate sentence to determine a set of grammatically correct sentences semantically similar to the input utterance. Also note that the generated semantically similar sentences are not restricted to be selected from an existing sentence database.

In specific embodiments may also include an existing statistical language model to which the grammatically correct sentences are added. For example, the existing statistical language model may be for a natural language processing application such as a user query interface or an automatic speech recognition application.

The semantic class generator may determine the corresponding semantically similar words based on using a generic ontology or a domain-specific ontology such as a domain-specific dictionary. The sentence verifier may grammatically test each candidate sentence using an existing language model, a syntactic parser, and/or a grammar checker.

DETAILED DESCRIPTION

Natural languages provide multiple different ways to express similar or the same situations. For example, the utterance "I want to change my home address" could be expressed as "I want to update my house address" or "I wish to modify my home address". Knowledge of the various ways of expressing a situation is useful for building language models for speech recognition and other natural language applications. Embodiments of the present invention are directed to generating a set of semantically similar sentences that correspond to a given input sentence. This can be useful, for example, for building better query interfaces for natural language applications.

Figure 1:
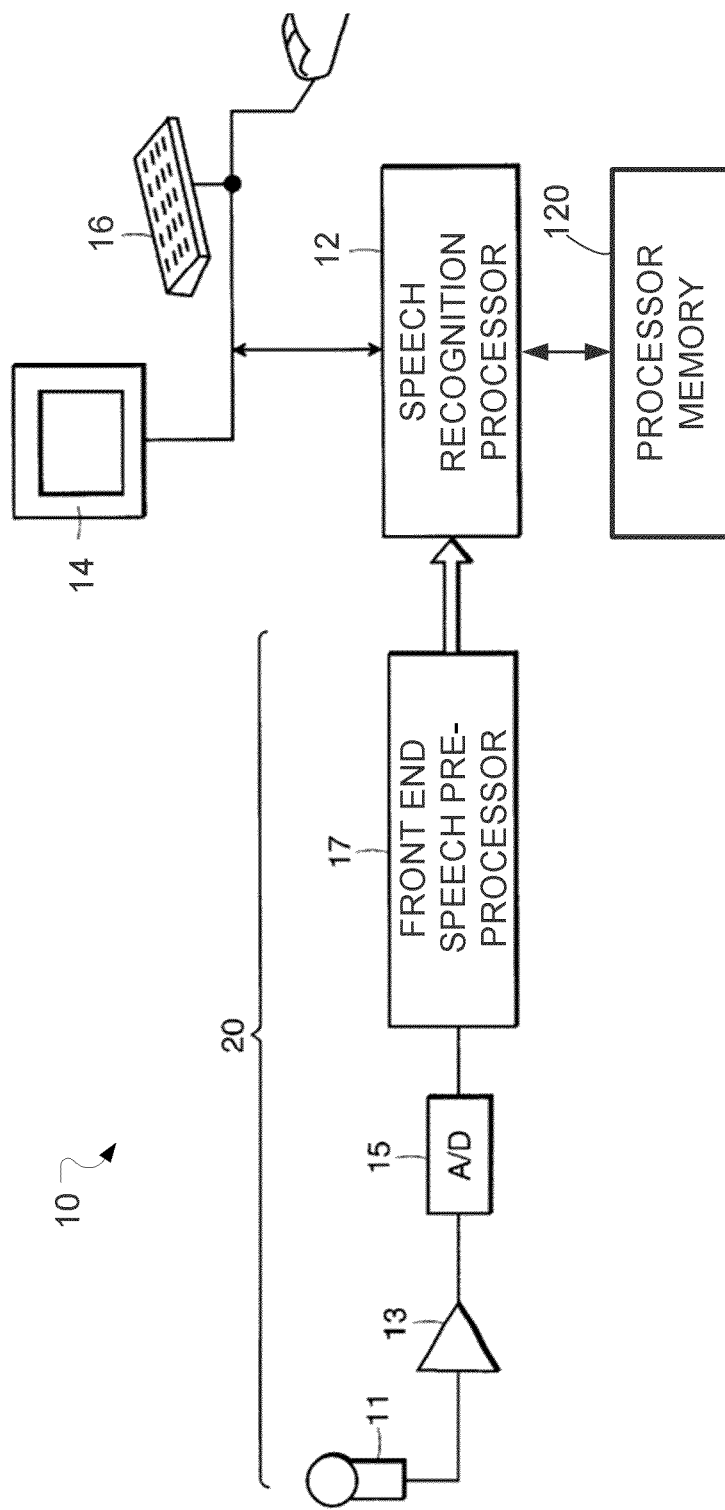
FIG. 1 shows various hardware components of an embodiment of an ASR system which uses a language model according to the present invention.

FIG. 1 shows various hardware components of an embodiment of an ASR system which uses a language model according to the present invention. A computer system 10 includes a speech input microphone 11 which is connected through a suitable preamplifier 13 to an analog-to-digital (A/D) converter 15. A front-end speech pre-processor 17 typically performs a Fourier transform so as to extract spectral features to characterize the input speech as a sequence of representative multi-dimensional vectors. A speech recognition processor 12, e.g., an Intel Core i7 processor or the like, is programmed to run one or more specialized computer software processes to determine a recognition output corresponding to the speech input. To that end, processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10.

Of course, many other typical arrangements are also familiar such as an ASR implemented for a mobile device such as a cell phone, ASR for the cabin of an automobile, client-server based ASR, etc. And while specific embodiments of the present invention are described herein in terms of an ASR-based arrangement, the invention is not limited to such systems and is broadly useful in the general field of natural language processing, especially for applications using a statistical language model, for example, in user interfaces for natural language dialog systems, etc.

Figure 2:
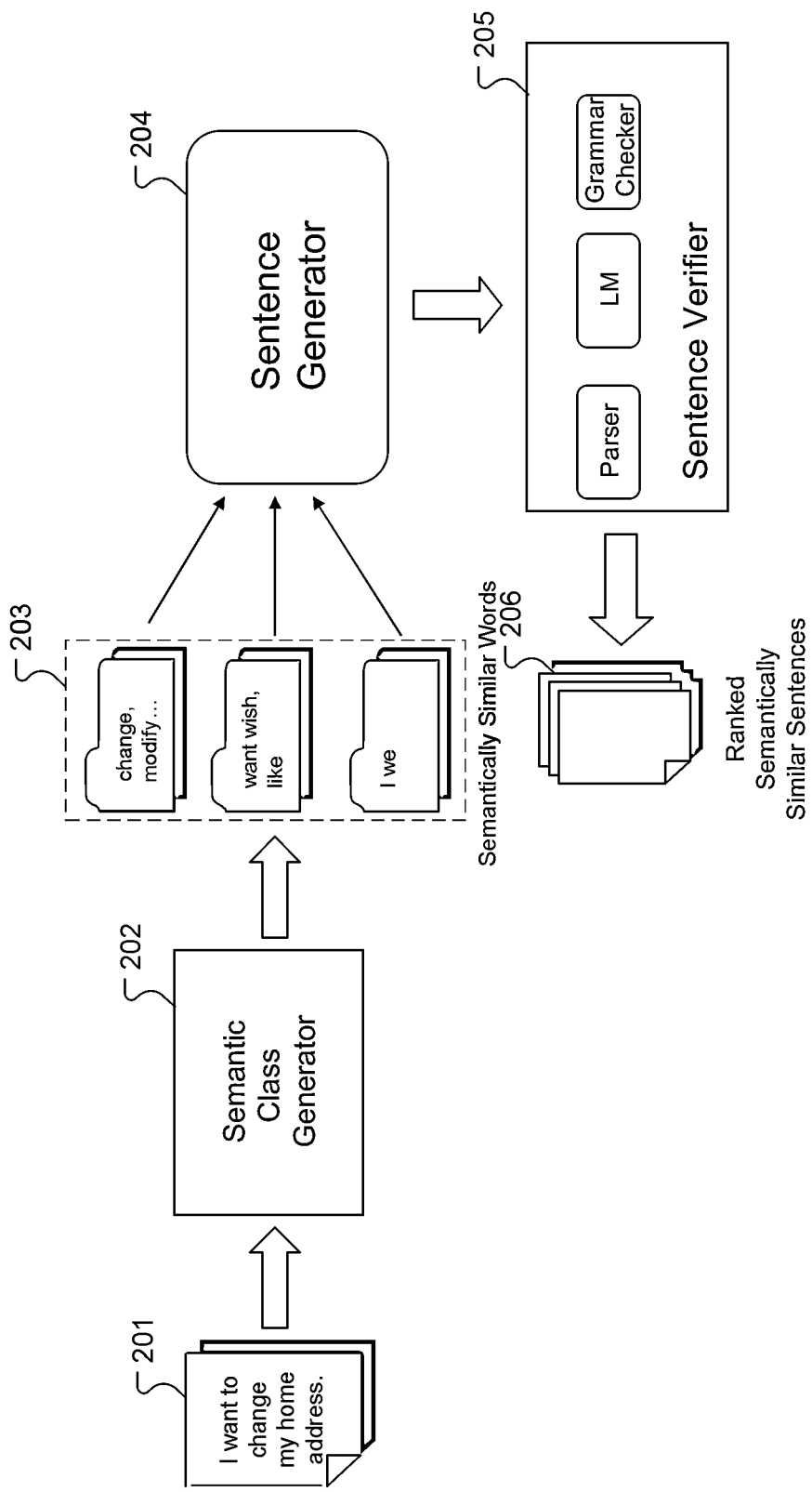
FIG. 2 shows the basic architecture of an embodiment for adding semantically similar sentences.
Figure 3:
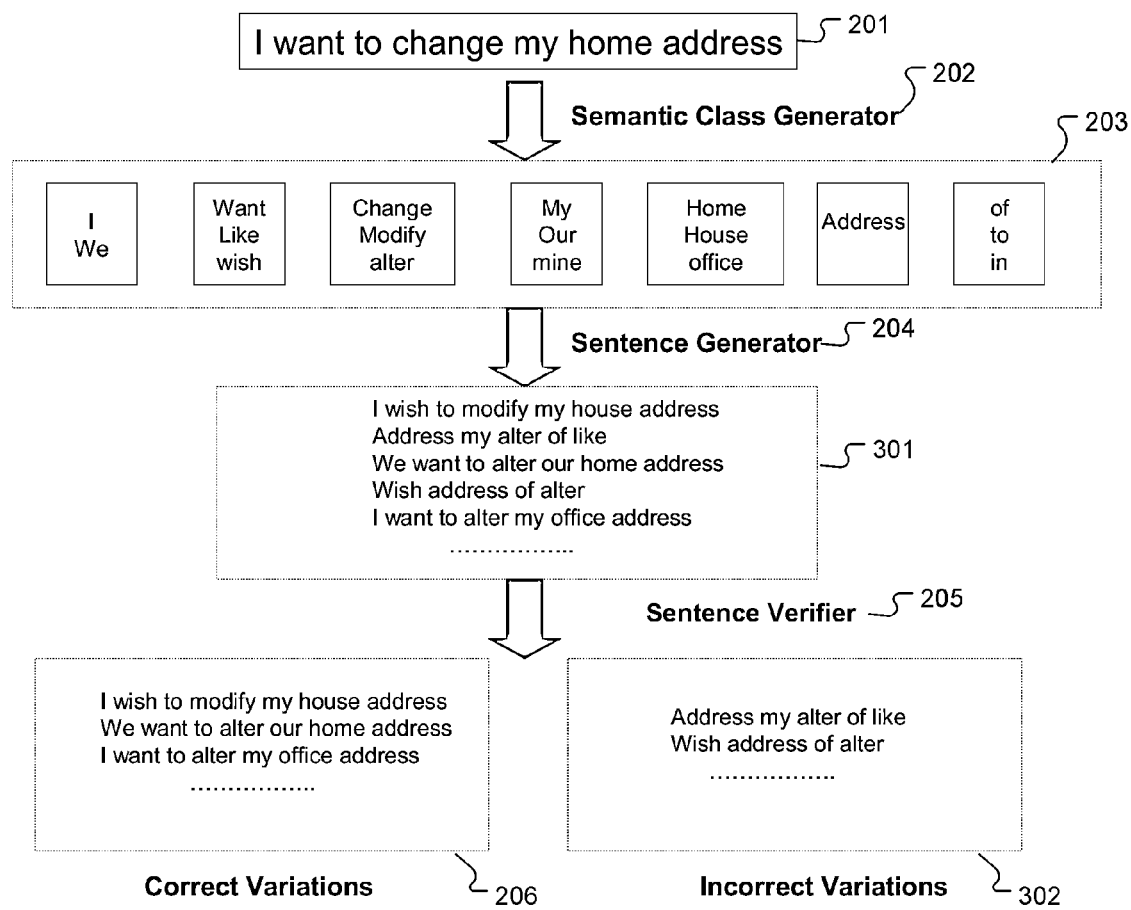
FIG. 3 shows an example of the text flows through an embodiment of the present invention.

FIG. 2 shows the basic architecture of one specific embodiment for generating semantically similar sentences for a statistical language model, and FIG. 3 shows an example of the text flows through such an embodiment. Initially, a given input sentence 201—in this case, "I want to change my home address."—is input to a semantic class generator 202 that provides a set of corresponding semantically similar words 203 for each word in the input sentence 201. Specifically, the semantic class generator 202 can be based on using generic ontologies such as WordNet, or domain-specific dictionaries that can be built manually or automatically.

Using the set of semantically similar words 203 from the semantic class generator 201, a sentence generator 204 computes a set of candidate sentences 301 each containing at most one member from each set of semantically similar words 203 that contain at most one word from each set. For each candidate sentence 301, a sentence verifier 205 uses a combination of language model, syntactic parsers and grammar checker to grammatically test each candidate sentence to determine a set of grammatically correct sentences 206 that are semantically similar to the input utterance 201.

The grammatically correct sentences 206 from the sentence verifier 205 can be added to an existing statistical language model, for example, in a natural language processing application such as a user query interface or an automatic speech recognition application. Incorrect variations 302 that fail the testing of the sentence verifier 205 can be discarded or saved for later study.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components. For example, a pseudo code representation of such an embodiment might be set forth as follows:

```
Process SemanticallySimilarSentences
    determine semantically_similar_words (input utterance)
    compute candidate_sentences (semantically_similar_words)
    test grammatically_correct_sentences (candidate_sentences)
```

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A system for generating semantically similar sentences, the system comprising:
   at least one processor; and
   non-transitory computer-readable media storing executable instructions that, when executed by the at least one processor, cause the system to:
      receive input speech;
      perform a Fourier transform to extract spectral features to characterize the input speech as a sequence of representative multi-dimensional vectors;
      process the sequence of representative multi-dimensional vectors using an automatic-speech-recognition function of a natural-language-processing application to determine a recognition output comprising an input utterance comprising a first word and a second word, the first word being before the second word;
      generate, for display, representative text corresponding to the recognition output comprising the input utterance;
      determine, for each word in the input utterance, a set of semantically similar words using a domain-specific ontology comprising a domain-specific dictionary;

compute a set of candidate sentences each containing at most one member from each set of semantically similar words, wherein at least one candidate sentence of the set of candidate sentences comprises a third word semantically similar to the first word, and a fourth word semantically similar to the second word, the fourth word being before the third word in the at least one candidate sentence;

grammatically test each candidate sentence of the set of candidate sentences to determine a set of grammatically correct sentences semantically similar to the input utterance and a set of grammatically incorrect sentences, wherein the grammatically testing each candidate sentence is performed using a syntactic parser, a language model different from the syntactic parser, and a grammar checker;

rank the set of grammatically correct sentences;

add the grammatically correct sentences to an existing statistical language model; and save the set of grammatically incorrect sentences.

2. The system of claim 1, wherein the non-transitory computer-readable media stores executable instructions that, when executed by the at least one processor, cause the system to:

receive the input speech through a user-query interface of the natural-language-processing application.

3. The system of claim 1, wherein the non-transitory computer-readable media stores executable instructions that, when executed by the at least one processor, cause the system to:

build the domain-specific dictionary manually.

4. The system of claim 1, wherein the non-transitory computer-readable media stores executable instructions that, when executed by the at least one processor, cause the system to:

build the domain-specific dictionary automatically.

5. One or more non-transitory computer-readable media storing executable instructions that, when executed by a processor, cause a device to:

receive input speech;

perform a Fourier transform to extract spectral features to characterize the input speech as a sequence of representative multi-dimensional vectors;

process the sequence of representative multi-dimensional vectors using an automatic-speech-recognition function of a natural-language-processing application to determine a recognition output comprising an input utterance comprising a first word and a second word, the first word being before the second word;

generate, for display, representative text corresponding to the recognition output comprising the input utterance;

determine, for each word in the input utterance, a set of semantically similar words using a domain-specific ontology comprising a domain-specific dictionary;

compute a set of candidate sentences each containing at most one member from each set of semantically similar words, wherein at least one candidate sentence of the set of candidate sentences comprises a third word semantically similar to the first word, and a fourth word semantically similar to the second word, the fourth word being before the third word in the at least one candidate sentence;

grammatically test each candidate sentence of the set of candidate sentences to determine a set of grammatically correct sentences semantically similar to the input utterance and a set of grammatically incorrect sentences, wherein the grammatically testing each candidate sentence is performed using a syntactic parser, a language model different from the syntactic parser, and a grammar checker;

rank the set of grammatically correct sentences;

add the grammatically correct sentences to an existing statistical language model; and save the set of grammatically incorrect sentences.

6. The one or more non-transitory computer-readable media of claim 5, storing executable instructions that, when executed by the processor, cause the device to:

receive the input speech through a user-query interface of the natural-language-processing application.

7. The one or more non-transitory computer-readable media of claim 5, storing executable instructions that, when executed by the processor, cause the device to:

build the domain-specific dictionary manually.

8. The one or more non-transitory computer-readable media of claim 5, storing executable instructions that, when executed by the processor, cause the device to:

build the domain-specific dictionary automatically.

9. One or more non-transitory computer-readable media storing executable instructions that, when executed by a processor, cause a device to:

receive input speech;

perform a Fourier transform to extract spectral features to characterize the input speech as a sequence of representative multi-dimensional vectors;

process the sequence of representative multi-dimensional vectors using an automatic-speech-recognition function of a natural-language-processing application to determine a recognition output comprising an input utterance comprising a first word and a second word, the first word being before the second word;

generate, for display, representative text corresponding to the recognition output comprising the input utterance;

determine, for each word in the input utterance, a set of semantically similar words using a generic ontology;

compute a set of candidate sentences each containing at most one member from each set of semantically similar words, wherein at least one candidate sentence of the set of candidate sentences comprises a third word semantically similar to the first word, and a fourth word semantically similar to the second word, the fourth word being before the third word in the at least one candidate sentence;

grammatically test each candidate sentence of the set of candidate sentences to determine a set of grammatically correct sentences semantically similar to the input utterance and a set of grammatically incorrect sentences, wherein the grammatically testing each candidate sentence is performed using a syntactic parser, a language model different from the syntactic parser, and a grammar checker;

rank the set of grammatically correct sentences;

add the grammatically correct sentences to the existing natural-language-processing statistical language model; and save the set of grammatically incorrect sentences.

10. The one or more non-transitory computer-readable media of claim 9, storing executable instructions that, when executed by the processor, cause the device to:

receive the input speech through a user-query interface of the natural-language-processing application.

* * * * *